United States Patent [19]
Beden

[11] 3,741,228
[45] June 26, 1973

[54] VALVE

[76] Inventor: Moses Beden, 466 Union Street, Lynn, Mass. 01901

[22] Filed: Dec. 8, 1971

[21] Appl. No.: 205,949

[52] U.S. Cl. .............................. 137/614.2, 251/57
[51] Int. Cl. ...................... F16k 25/00, F16k 39/00
[58] Field of Search .................... 137/614.2, 625.48, 137/625.49; 251/62, 63, 63.5, 63.6, 57

[56] References Cited
UNITED STATES PATENTS

| 874,106 | 12/1907 | McCarrol | 251/57 |
|---|---|---|---|
| 2,596,532 | 5/1952 | Coolidge et al. | 251/62 |
| 2,352,140 | 6/1944 | Trott | 251/57 X |
| 3,046,802 | 7/1962 | Cupedo | 251/62 X |
| 3,570,540 | 3/1971 | McInnes et al. | 251/62 X |

Primary Examiner—Samuel Scott
Assistant Examiner—Ira S. Lazarus
Attorney—Wolf, Greenfield and Sacks

[57] ABSTRACT

An improved valve includes a hollow valve body which contains slidably a floating piston. One end of the valve body includes inlet and outlet ports and the other end on the opposite side of the piston defines a fluid filled chamber. An axially slidable plunger extends through the valve body into the liquid filled chamber. As the plunger advances the pressure of the fluid in the chamber increases which urges the floating piston toward the inlet port to close it. A fail-safe feature is employed in that if the fluid leaks from the chamber, the continued advancement of the plunger will mechanically force the floating piston against the valve seat. In a modificaiton of the valve a double concentric piston is employed to effect a multiple concentric seal. The valve also includes an improved check valve at the inlet port.

14 Claims, 3 Drawing Figures

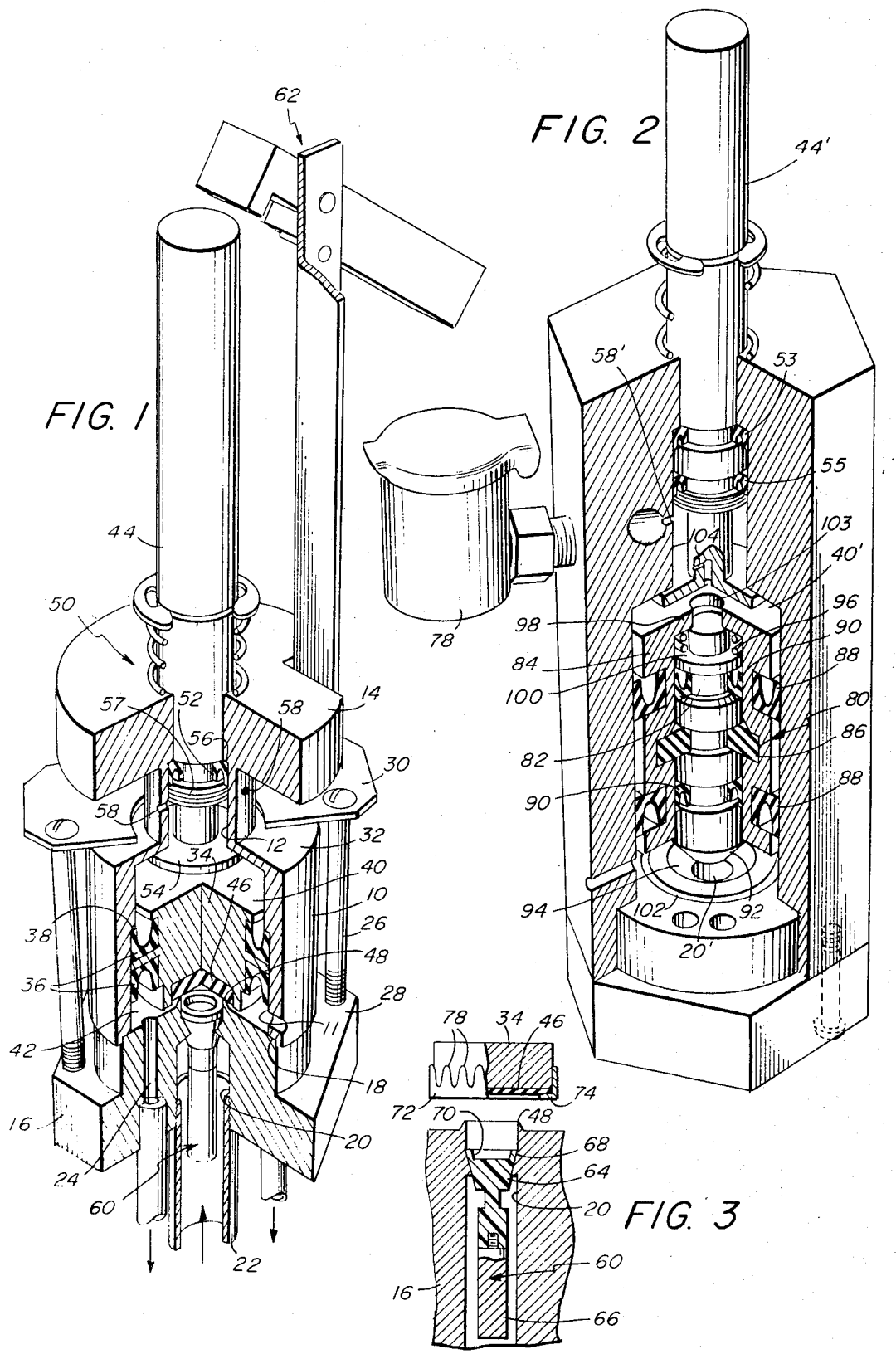

VALVE

SUMMARY OF THE INVENTION

An improved valve includes a valve body defining a bore which guides a slidable freely moving piston. The piston defines a valve chamber and a pressure chamber on its opposite sides within the bore. A plunger is slidable axially toward and away from the piston through an end of the valve body and extends into the fluid filled pressure chamber. The valve chamber includes inlet and outlet ports and an improved check valve at the inlet port. The piston cooperates with a valve seat formed in the valve chamber to open and close the inlet port. When the plunger is urged axially into the pressure chamber the increased fluid pressure drives the piston toward the valve seat to close the inlet port. The cross sectional area of the inner end of the plunger is smaller than that of the piston to provide a mechanical advantage and urge the valve portion of the piston against the inlet port to seal the port under a substantially increased force. The plunger and piston also are arranged to provide a fail-safe feature in which the plunger is urged mechanically against the floating piston in the event that the fluid pressure within the pressure chamber is not transferred fully to the floating piston. A modified version of the valve includes a specially designed double piston which forms a multiple safety seal about the inlet port.

Among the objects of the invention is to provide an improved valve having improved sealing characteristics and which reduces substantially any likelihood of leakage.

Also among the objects of the invention is to provide an improved valve employing a freely moveable piston as a valve member.

Another object of the invention is to provide a valve having a fail-safe feature.

A further object of the invention is to provide a valve which is self-priming.

Still another object of the invention is to provide a valve which may be disassembled and reassembled easily.

A further object of the invention is to provide a valve having improved check valve means at its inlet port.

DESCRIPTION OF THE DRAWINGS

The foregoing and other objects and advantages of the invention will be understood more fully from the following detailed description thereof, with reference to the accompanying drawings wherein:

FIG. 1 is a cut-a-way view of one embodiment of the valve;

FIG. 2 is a cut-a-way view of another embodiment of the valve; and

FIG. 3 is an illustration of the improved check valve and the arrangement at the lower end of the piston.

DETAILED DESCRIPTION OF THE INVENTION

FIG. 1 shows an embodiment of the invention having the valve body 10. The valve body 10 includes a main bore 11. A reduced diameter bore 12 is formed at its upper end. The valve body 10 may terminate at its upper end in an enlarged flange 14. The lower end of the valve body is closed by a bottom cap 16 received in a shoulder 18 formed at the bottom of the valve body 10. An inlet port 20 is formed centrally through the bottom cap 16 and the valve may be supported at the inlet port 20 by threading it about an inlet tube 22. The bottom cap 16 also includes at least one outlet port 24. Alternatively, one or more outlet ports may be formed in the sidewall of the valve body 10 itself. The valve body 10 and bottom cap 16 preferably are retained firmly together by two or more bolts 26 which are threaded into an enlarged flange 28 formed integrally with the bottom cap 16. The upper end of the screws extend through a V-shaped retaining bracket or collar 30 which engages the upper region of the valve body, such as the shoulder 32. This arrangement facilitates disassembly of the valve to expose easily the interior elements described below.

The inlet port 20 is opened and closed by the action of a floating piston 34 which is slidably received within the bore 11. The piston 34 is sealed against the bore 11 by a pair of resilient U-groove piston rings 36. The upward limit of the floating pistons travel is governed by a shoulder 38 formed interiorly of the valve body 10 which engages the upper of the piston rings 36 as shown. The floating piston 34 thus defines an upper chamber 40 and a lower chamber 42. The upper chamber 40 is filled with a liquid as described herein, and receives the lower end of a plunger 44 which is slidable axially through the upper end of the housing 10. The plunger 44 and fluid within the chamber 40 cooperate to drive the floating piston 34 in the manner described below.

The underside of the piston 34 is fitted with a resilient valve pad 46 which may be fabricated from rubber or other appropriate resilient material. The pad 46 may be retained by an arrangement later described which facilitates replacement of the pad 46 when desired. When the floating piston 34 is urged downwardly, the pad 46 engages the rim 48 of the inlet port 20. The rim 48 preferably extends upwardly from the inner surface of the bottom cap 16, surrounding the inlet port 20. The rim 48 is tapered upwardly so that the valve pad 46 may be urged snugly and into firm sealing contact with the rim 48, to shut the inlet port.

The floating piston 34 is driven in response to pressure increase within the chamber caused by inward axial movement of the plunger 44. The plunger is biased in its remote upper position shown by a spring arrangement 50. The plunger includes a sealing ring 52 which effects a sliding seal between the lower end of the plunger and the interior of the bore 12. The portion of the plunger below the sealing ring 52 extends downwardly through the bore 12 and into the upper chamber 40 and may terminate in an enlarged flange 54. The upper limit of plunger travel is governed by engagement of the sealing ring with a shoulder 56 formed at the upper end of the housing. The various parts of the plunger are dimensioned so that when the plunger 44 is in its uppermost position, the flange 54 will be spaced from the interior of the housing to provide communication between the interior of the neck and the upper chamber 40 to facilitate self priming of the chamber 40 as described below. An important feature of the invention is that the effective cross sectional area of the lower end of the plunger 44 is less than that of the piston 34 so that a substantial mechanical advantage may be achieved to urge the piston into seating engagement with the rim 48 under a substantial force. The relative dimensions between the plunger and piston may be varied in order to suit the particular environment in which the valve is used.

The chamber 40 is primed with liquid by means of one or more priming orifices 58 formed through the valve at the bore 12. When the valve is employed in a lavatory, as a ballcock valve, the chamber 40 is filled with liquid at all times because when the water rises to the level of the orifices 58 the water may flow into the neck and fill the chamber 40 to the level of the orifices 58. The multiple priming orifices 58 enable air to escape from the chamber 40 while priming liquid flows into other of the orifices 58. Alternatively, the orifices 58 may be connected to an independent fluid source which will tend to feed fluid through the orifices 58 at all times. Such an arrangement is described below in connection with the description of another embodiment of the invention.

When the plunger 44 is in its upper retracted position shown, fluid under pressure will flow through the tube 20, past the check valve 60, into the lower chamber 42 and then out through the outlet ports 24. In order to shut the valve, the plunger 44 is urged axially into the housing 10. When the valve is used as a ballcock, the plunger 44 is actuated by the usual float and lever arrangement 62. It should be noted that when the plunger 44 is in its upper retracted position, the float valve 34 is urged upwardly by the pressure of the fluid from the inlet 22 and is not seated against the rim 48.

When the plunger is urged downwardly to close the valve, the sealing ring 52 advances past the priming orifices 58 to seal them off and to enclose fully the chamber 40 and liquid contained therein. Further axial advancement of the plunger 44 increases the pressure within the chamber 40 and urges the floating piston 34 downwardly toward seating engagment with the inlet port under a mechanical advantage. Because the chamber 40 is sealed fully, the plunger will not engage the piston 34 but will transmit its force solely through the increased fluid pressure within the chamber 40.

Among the features of the invention is the fail-safe construction of the valve. In the unlikely event that any of the seals fail or if for any reason the force of the advancing plunger 44 is not transmitted effectively through the fluid in the chamber 40 to the upper end of the floating piston 34, the plunger 44 will be able to continue its axial advancement beyond its normal innermost position so that its inner end and flange 34 may bear directly and mechanically against the upper end of the floating piston. This insures that, even in the event that failure of the seals, the valve still will be shut off.

Preferably the lower end of the plunger 44 is arranged at relation to the piston 34 so that when the orifices 58 are sealed off the lower end of the plunger 44 is spaced slightly from the upper end of the piston but in proximity thereto. In an instant where the fail-safe feature becomes operative, with the plunger 44 advancing further toward the piston, it is desirable that the additional stroke necessary for the plunger 44 to seal mecahnically the valve be maintained relatively short. In this connection, the lower end of the valve may be longitudinally adjustable in relation to the valve, as by a threaded connection. The extent of inward projection of the lower end of the plunger 44 may be varied by inserting shim washers 57 between the threadably connected portions of the plunger 44.

Also among the features of the invention is a specially formed check valve 60 to preclude reversed flow from the lower chamber to the inlet tube 22 in the event of failure of the water pressure in the main supply tube 22. As shown more clearly in FIG. 3, the check valve 60 is elongated having an upper head 64 and a downwardly extending weighted end 66. The head 64 is conical and seats within a conical valve seat 68 formed at the inner end of the inlet port 20. The upper end of the check valve head 64 is hollowed out to define a circumferential thin wall 70. At least the head 64 of the valve 60 is formed from a flexible resilient material, such as plastic, or an appropriate rubber to enable the wall 70 to flex in response to increased pressure against the inside of the wall 70. In the event that the pressure within the lower chamber 42 built up excessively, the effectiveness of the check valve would be enhanced as the greater pressure in the lower chamber would urge the flexible wall 70 of the check valve head 64 more firmly against the tapered seat 68. The lower weighted portion 66 of the check valve 60 maintains the valve in its upright seating orientation so that it will mate with the conical seating surface 68 properly.

FIG. 3 also shows the arrangement for replacably mounting the valve pad 46. The arrangement includes a ring 72 which fits over the lower end of the floating piston 34 and which holds the valve pad in place by the inwardly extending flange 74. The ring is detachably secured to the underside of the piston 34 by means of a number of upwardly extending spring fingers 78 which grip with sufficient firmness, the outer surface of the lower end of the floating piston 34. Once the piston has been exposed, the pad 46 may be changed easily. This arrangement may be substituted for that shown in FIG. 1.

FIG. 2 shows a modified version of the invention. In this embodiment, the upper chamber 40' is primed by a liquid reservoir 78 connected to the housing in communication with the priming orifice 58'. The valve may be employed to be operated in any attitude as long as the reservoir 78 is disposed so that the liquid therein may flow, preferably by gravity, through the orifice into the upper chamber 40'.

The embodiment in FIG. 2 differs primarily in the configuration and mode of operation of the floating piston, indicated generally by the reference character 80. The piston arrangement 80 includes a pair of concentric pistons including an inner piston 82 and an outer piston 84 which surrounds the inner piston 82. The inner and outer pistons 82, 84 are connected resiliently to each other for unitary movement by a flexible resilient ring 86 which is retained in appropriately formed slots in the inner and outer pistons 82, 84, as shown. The flexible ring 86 also enables limited relative movement between the pistons 82, 84 as described below. The outer piston 82 is slidably sealed against the inner surface of the housing by means of a pair of axially spaced U-groove piston rings 88. Additional sealing rings 90 may be provided between the inner nad outer pistons as shown. The sealing rings 90 preferably are also of the U-groove type.

The lower end of the inner piston 82 has a conical valve member 92 formed thereon which is adapted to cooperate with the centrally located conical valve seat 94 at the inlet port 20'. The inner piston normally is disposed so that its conical valve 92 extends downwardly below the lower end of the outer piston. This relative position of the pistons 82, 84 is maintained both by the resilient ring 86 and by a compression spring 96 disposed between the upper end of the inner piston 82 and the inner surface of the upper end of the outer piston 84. The outer piston 84 includes an inwardly extending flange 98 at it upper end to receive and engage the compression spring 96. Similarly, the upper end of the inner piston 82 also includes a shoulder 100 to retain the spring 96.

When the valve is open, its operation is substantially the same as that of the earlier described embodiment of FIG. 1. When the plunger 44' is urged downwardly to close the valve, the priming orifice 58' is sealed thus enclosing fully the liquid within the upper chamber 40'. Continued advancement of the plunger 44' urges both the inner and outer pistons 82, 84 simultaneously downwardly until the conical valve 92 on the inner piston engages the valve seat 94 at the bottom of the lower chamber. The pressure of the liquid in the upper chamber 40' is transmitted to the upper end of the inner piston by the opening 103 formed in the upper end of the outer piston. The pistons are urged downwardly solely in response to the increased pressure within the upper chamber 40' the plunger being spaced from the pistons.

An additional seal is obtained at the inlet by further advancement of the plunger to urge the outer piston 84 further downwardly until the lower end of the outer piston 84 seats firmly against the bottom of the lower chamber. In further downward advancement of the outer piston with respect to the inner piston, the biasing of the ring 86 and compression spring 96 is overcome. The inner region of the outer piston 84 just above the ring 86 preferably is slightly rounded or beveled as shown at 80 so that the ring 86 will not be damaged as it is flexed. The outer piston effects an additional, supplemental seal surrounding circumferentially the seal formed by the inner piston. If desired, one or more O-rings 102 may be provided at the seating surfaces of the bottom of the lower chamber to enhance further the seal between the pistons 82, 84 and the bottom of the chamber.

This embodiment also includes the fail-safe feature described earlier in that if, for any reason, the full axial force of the plunger is not transmitted fully through the liquid, continued advancement of the plunger will cause its lower end to bear mechanically and directly against the upper end of the outer piston. This effectively locks the outer piston in its downward sealed position. The inner piston is maintained firmly against the valve seat 94 by the collar 98 at the upper end of the outer piston 94. The lower end of the plunger 44' also includes a bleed hole 104 to enable liquid entrapped between the inner and outer pistons 82, 84 to escape so as not to preclude downward movement of the outer piston 84.

It should be understood that the foregoing description of the invention is intended merely to be illustrative thereof and that other embodiments and modifications may be apparent to those skilled in the art without departing from its spirit. For example, my valve is very effective as a ballcock valve as is commonly found in a lavatory. One of the common difficulties with such valves is that they display a strong tendency to leak. While my valve is suited for use in that environment it also is very effective in other environments in which a reliable sealing valve is required.

Having thus described the invention, what I desire to claim and secure by Letters Patent is:

1. A valve comprising:
   a housing having a bore formed therein;
   piston means slidable within said bore, said piston defining first and second chambers on opposite sides thereof;
   an inlet port formed in one end of said housing in communication with said first chamber;
   outlet means formed in said end of said housing in communication with said first chamber;
   said piston means being slidable toward and away from said inlet port and having seating means formed thereon for engagement with said inlet port to open or close said inlet port;
   a plunger extending through the outer end of said housing and being slidable therein in alignment with said piston, the inner end of said plunger extending into said second chamber, said plunger being moveable along a path toward and away from said piston means;
   means for introducing fluid to said second chamber;
   means for sealing said second chamber to enable axial movement of said piston means in response to movement of said plunger toward said piston, whereby said piston means may be urged toward said inlet port, said alignment of said plunger and piston means providing a fail-safe characteristic in which leakage of pressurized fluid from said second chamber will enable said plunger to advance further into firm abutting engagement with said piston means.

2. A valve as defined in claim 1 further comprising: said inner end of said plunger being of smaller effective cross-sectional area then that of said piston means.

3. A valve as defined in claim 2 wherein said means for introducing said liquid into said second chamber comprises:
   an orifice formed in said housing in communication with said second chamber;
   sealing means on said plunger for movement in unison therewith past said orifice for sealing said orifice in response to inward axial advancement of said plunger to a predetermined extent whereby continued advancement of said plunger will effect pressurization of said liquid.

4. A valve as defined in claim 3 wherein said sealing means comprises:
   a sealing ring formed on said plunger, said sealing ring, plunger orifice, and piston being so constructed and arranged that said sealing ring closes said orifice before the inner end of said plunger reaches said piston means.

5. A valve as defined in claim 4 further comprising: means for limiting the extent movement of said piston means toward said second chamber.

6. A valve as defined in claim 5 wherein said limiting means for said piston means comprises:
   said piston means including piston rings formed thereabout in sliding, sealing engagement with said bore; and
   a shoulder formed on said bore in said second chamber and engagable with one of said piston rings.

7. A valve as defined in claim 2 wherein that end of said valve housing in which said ports are formed comprises:
   an end cap having said inlet and outlet ports formed therein;

a bracket engagable with the other end of said valve body; and means securing said bracket to said end cap to grip said valve body firmly therebetween.

8. A valve as defined in claim 2 further comprising:

bias means for urging said plunger away from said piston means.

9. A valve as defined in claim 2 wherein said inlet port further comprises:

means forming an upstanding ridge about the inner end of said inlet port;

that surface of said piston defining said first chamber including a resilient pad facing said inlet port and said ridge; and a ring having a lip for holding said pad to said piston, said ring including a plurality of spring fingers formed circumferentially about said ring, said fingers being adapted to resiliently engage said piston.

10. A valve as defined in claim 2 further comprising:

a check valve formed in said inlet port.

11. A valve as defined in claim 10 wherein said check valve comprises:

an elongate member having a head formed at its upper end and a weighted lower end;

said head being of conical contour, said valve seat in said inlet port being of complementary conical configuration adapted to receive said conical head of said check valve;

the upper end of said head being hollow to define a conical wall, at least said head portion of said check valve being formed from a flexible resilient material, whereby increased pressure within said first chamber may increase the effectiveness of the seal of said check valve in the region of said flexible wall thereof.

12. A valve as defined in claim 2 wherein said piston means comprises:

an outer piston slidable within said bore;

an inner piston supported concentrically within said outer piston;

the lower end of said inner piston extending beyond the lower end of said outer piston;

means biasing said inner and outer pistons in said relative position;

means for yieldably connecting said inner and outer pistons to each other for movement in unison and in relation to each other;

a valve member formed at the lower projecting end of said inner piston, said valve member being engagable with a complementary valve seat formed at the inlet port at said end of said housing;

the upper end of said pistons both being exposed to the second chamber, whereby upon advancement of said plunger toward said piston means, said pistons will move in unison toward said outlet port to cause the lower end of said inner piston to seat against the said outlet port, further axial advancement of said plunger causing said outer piston to continue advancement toward said lower end of said valve and to seat firmly at said lower end of said valve concentrically and about said inner piston thereby to effect a supplemental seal about said inner piston and inlet port.

13. A valve as defined in claim 12 wherein said means for yieldably connecting said inner and outer pistons comprises:

a flexible, resilient ring surrounding said inner piston intermediate its ends, said ring projecting radially outwardly from said inner piston; and said outer piston including a groove formed interiorly thereof and intermediate its ends, said groove being receptive to the radially projecting region of said ring on said inner piston.

14. A valve as defined in claim 13 further comprising:

the upper portion of said groove formed within the outer piston being chamfered.

* * * * *